(No Model.)

A. BERNSTEIN.
Apparatus for Testing Illuminating Fluids.

No. 240,365.   Patented April 19, 1881.

Witnesses:
Floyd Norris
Howell Bartle

Inventor:
pro Alex Bernstein
Johnson and Johnson
Attys

UNITED STATES PATENT OFFICE.

ALEX BERNSTEIN, OF NEW YORK, N. Y., ASSIGNOR TO LOCKWOOD BROTHERS & HOLLY, OF SAME PLACE.

APPARATUS FOR TESTING ILLUMINATING-FLUIDS.

SPECIFICATION forming part of Letters Patent No. 240,365, dated April 19, 1881.

Application filed February 10, 1881. (No model.) Patented in Germany May 9, 1879, and July 24, 1879.

*To all whom it may concern:*

Be it known that I, ALEX BERNSTEIN, a subject of the King of Prussia, German Emperor, but now residing at New York city, in the county of New York and State of New York, have invented new and useful Improvements in Apparatus for Testing the Inflammability of Oils, (for which I have obtained imperial German patents No. 7,508, of May 9, 1879, and No. 8,389, of July 24, 1879,) of which the following is a specification.

The invention relates to that class of devices for testing hydrocarbon fluids by means of a thermometer which indicates the temperature at which the vapors induced by heat may be ignited in various ways—in brief, devices of the "fire-test" class.

The main object of my improvement is to eject the vapors of the heated oil to a fixed flame to be ignited at a degree of temperature indicated by a thermometer; secondly, to obtain this vapor-ejecting pressure by the weight of water or hydrostatic pressure; thirdly, to so construct and arrange a movable apparatus within a heated water-bath as to effect the results sought; and, finally, to measure the temperature of the bath and to agitate it during the warming, to render the heat uniform, all of which objects I attain by substantially such an apparatus as is hereinafter described, and shown in the accompanying drawings, in which—

Figure 1:
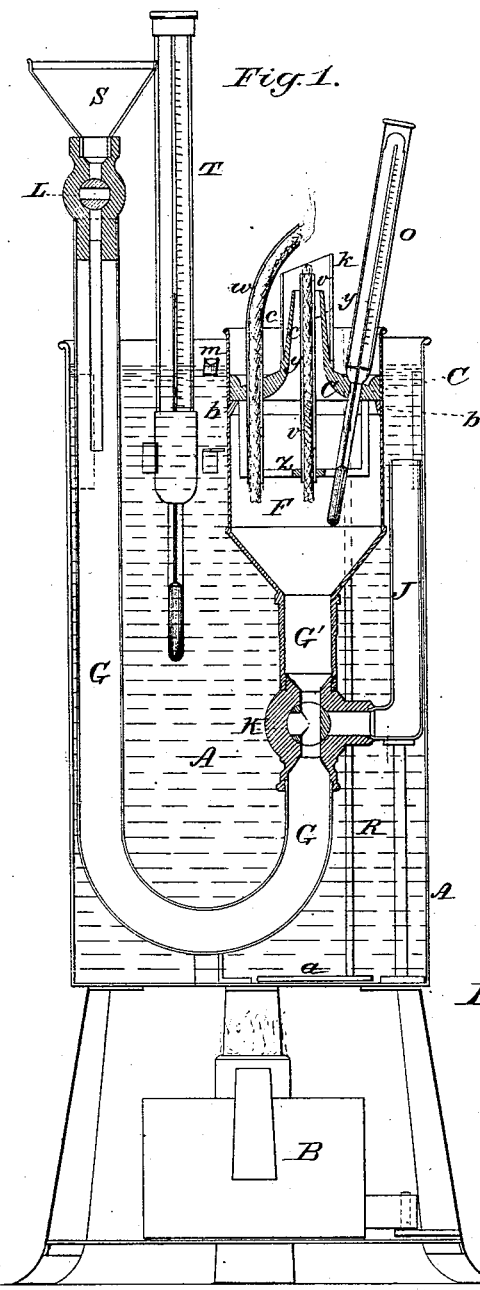
Figure 2:
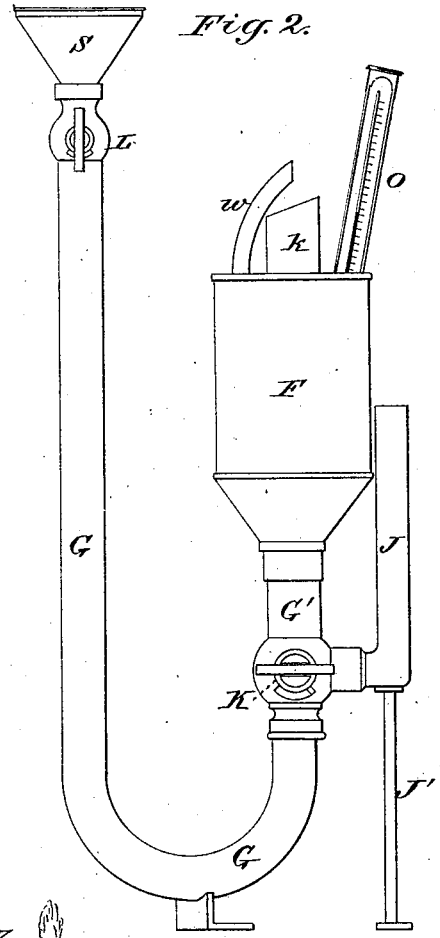
Figure 3:
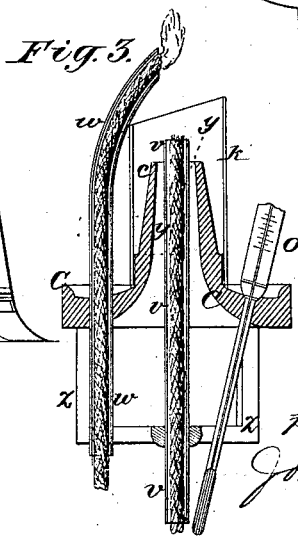
Figure 4:
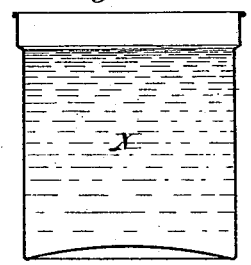

Figure 1 represents a vertical section of the bath and testing devices, illustrating my invention. Fig. 2 is the testing devices proper; Fig. 3, a vertical section of the cover of the oil-vessel and its parts, and Fig. 4 a measuring-cup for the oil to insure uniformity of results in testing.

The bath is preferably a cylindrical vessel, A, open at the top, and supported upon a tripod, which carries a heating-lamp, B, of any approved make. This vessel A is filled with water up to the marker $m$, so as to inclose the oil-vessel, and is heated by the lamp B, and its temperature indicated by a thermometer, T, suitably arranged and supported within the bath. A suitable stirring-rod, R, having at its lower end a horizontal plate or paddle, $a$, may be moved up and down to render the temperature uniform throughout the bath.

The oil to be tested is measured in the vessel X, and the ascertained quantity of petroleum or other oil to be tested is poured into the oil-vessel F, which latter has a conical bottom terminating in a pipe, G', which continues downward, and, forming a half-circle, rises considerably above the bath-vessel, as pipe G, as in Fig. 1, and terminates in a funnel, S, while below said furnace and below said oil-vessel are a cock, L, and a three-way cock, K, respectively, for purposes to be hereinafter described.

Issuing from pipe G, from the right, as seen in the drawings, and in communication with the three-way cock K, is a pipe, J, which continues upward a sufficient distance, and has a supporting leg and foot, J', resting upon the bottom of the bath-vessel. At the position of the cock K shown in Fig. 1 the pipe G is cut off from the pipe J, while in the position shown in Fig. 2 communication is cut off from the oil-vessel F, and the pipe G is in communication with pipe J, and in this latter adjustment of the said cock water in the pipe G passes up into pipe J, as will be presently described.

The oil-vessel F, upon its inner wall, near the top, has an annular ledge or ring, $b$, for the purpose of supporting its cover C, which latter is removed when the vessel F is to be supplied with oil. This cover is of peculiar construction, a central tube, $c$, rising from it and rendering the cover a sort of concave cone; but this shape is not absolutely necessary, as only a central sleeve or pipe, $c$, is necessary for the passage of a pipe, $v$, containing a wick or other igniter and extending above said tube or sleeve. At one side of the central sleeve a torch-pipe, $w$, pierces the cover and is provided with a wick receiving its supply from the vessel F, and which extends upward and curves or extends over the pipe $v$, and is ignited to constitute a fixed flame. The pipe $v$ passes through the sleeve so as to leave a free passage, $y$, around it, and is supported by an arm, $z$, beneath the cover and fastened to it. The said cover, on the other side, is pierced for a thermometer, O, which indicates the temperature of the oil or vapors in the vessel.

In using the apparatus the inside parts connected with the oil-vessel F or the testing devices proper are first removed from the bath-vessel A and water put into the latter, as before mentioned, and heated by the lamp to the degree at which the test is to be made, which is indicated by the thermometer T. Then the three-way cock K and the cock L are operated so as to shut off connection with vessel F and place the funnel S and pipes G and J in communication, as shown in Fig. 2; and the cover C of the oil-vessel F being removed, and a measured quantity of petroleum (as measured by cup X or other measure) being poured into the vessel F, water is poured into the funnel S until it comes out at the exit of pipe J, when the cocks K and L are again manipulated, L to close the funnel-bottom and K to cut off the pipe J, as shown in Fig. 1, and the tester devices proper (shown in Fig. 2) are put into the bath. After the petroleum has reached the temperature at which the test is to be made the funnel S is filled with water, the fixed torch w is lighted, and the cock L turned to let this water into pipe G, when the hydrostatic pressure will force whatever vapors or gas are developed by the heated petroleum at this temperature up through the annulus or free passage y, where they will ignite by coming in contact with the fixed torch, and the flame will be carried down to the wick in pipe v, thus giving an unmistakable sign of the presence of inflammable vapors in an entirely mechanical way. In case the trial is to be repeated upon the same oil in the vessel, to see whether the oil would create inflammable vapors at a lower or different temperature, then draw out the water from pipe G through funnel S by any approved pump or means, and proceed as before described for obtaining hydrostatic pressure, to eject the vapors.

It is obvious that I may depart from the exact forms and construction of the described parts without avoiding my invention, so long as I preserve the arrangements and communications to perform the several steps in the operation set forth.

It is obvious, also, that variations of the apparatus might be made whereby the induced vapors of petroleum or inflammable oil might be ejected against a fixed torch issuing from the oil-vessel by other means than hydrostatic pressure, and adapted to ignite a wick or other ignitable substance.

I provide the cover C with a shield, k, adapted to surround the sleeve c and rise slightly above it to prevent down drafts of air.

I claim—

1. In an apparatus for testing the inflammability of oils, the combination, with an oil receptacle or vessel, F, provided with a fixed torch, w, a wick-pipe, v, beneath it, and a thermometer, O, of a hydrostatic tube, G, whereby the induced vapors are ejected at an ascertained temperature and ignited by the fixed torch and the ignition communicated to the wick v, substantially as described.

2. In an apparatus for testing the inflammability of oils, the combination, with the oil-vessel F, provided with a vapor-igniting exit, the pipes G and J of the cock L, beneath the funnel S in said pipe G, and the three-way cock K, beneath vessel F, and communicating with pipes G J, substantially as and for the purpose described.

3. In an apparatus for testing the inflammability of oils wherein the vapors of the oil-vessel, induced by heat, are ejected against a fixed flame by upward pressure upon the contained oil, the cover C of the oil-vessel, having central sleeve, c, with a wick-tube, v, passing through it and forming an annular passage, y, for the escape of the vapors to a fixed torch, substantially as and for the purpose described.

4. In an apparatus for testing the inflammability of oils, the removable cover C of the oil-vessel F, provided with a central sleeve, c, with a wick-tube, v, passing through it and forming an annular passage, y, for the escape of vapors, in combination with a fixed torch, w, and hydrostatic pipes to force the induced vapors at a certain temperature against said torch to be ignited, substantially as and for the purpose described.

5. For testing the inflammability of hydrocarbon oils, a cover for the oil-vessel F, provided with an outward-extending exit for the induced vapors, a wick-tube within said exit-passage and extending above its outlet, and a wick-tube outside of said exit-passage extending above and over said interior wick-tube, substantially as described, for the purpose specified.

6. The cover C for the oil-vessel F, provided with an outward tubular extension, c, an interior wick-tube, v, forming with said extension an exit-passage for the induced vapors from said vessel and extending above said tube c, a wick-tube, w, outside of said tubular extension, and a thermometer, O, substantially as described.

7. The combination, in apparatus for testing illuminating-oils, of the oil-vessel F, a cover therefor having an outward-extending exit-passage, a wick-tube, v, within said exit-passage, a wick-tube, w, without said exit-passage and overhanging the said interior wick-tube, with a shield, k, surrounding and rising above the outlet for the said extended passage, substantially as described, for the purpose specified.

In testimony whereof I have hereunto set my hand in the presence of two subscribing witnesses.

ALEX BERNSTEIN.

Witnesses:
GODFREY PATTERSON,
JOHN D. KASSEBARTH.